United States Patent [19]

Amjad et al.

[11] Patent Number: 4,952,326
[45] Date of Patent: * Aug. 28, 1990

[54] DISPERSION OF PARTICULATES IN AN AQUEOUS MEDIUM

[75] Inventors: Zahid Amjad, Avon Lake; William F. Masler, Hinckley, both of Ohio

[73] Assignee: The B. F. Goodrich Company, Akron, Ohio

[*] Notice: The portion of the term of this patent subsequent to Dec. 5, 2006 has been disclaimed.

[21] Appl. No.: 235,266

[22] Filed: Aug. 23, 1988

Related U.S. Application Data

[63] Continuation-in-part of Ser. No. 939,498, Dec. 8, 1986, abandoned.

[51] Int. Cl.$^5$ ................................................ C02F 5/12
[52] U.S. Cl. ...................................... 210/701; 252/180
[58] Field of Search ............................. 210/698–701; 252/180, 181

[56] References Cited

U.S. PATENT DOCUMENTS

| | | | |
|---|---|---|---|
| 3,682,224 | 8/1972 | Blegle | 210/701 |
| 3,709,815 | 1/1973 | Boothe et al. | 210/701 |
| 3,709,816 | 1/1973 | Walker et al. | 210/701 |
| 3,790,610 | 2/1974 | Lum et al. | 210/701 |
| 3,806,367 | 4/1974 | Lange et al. | 210/701 |
| 3,898,037 | 8/1975 | Lange et al. | 210/701 |
| 3,928,196 | 12/1975 | Persinski et al. | 210/701 |
| 4,425,326 | 1/1984 | Guillon et al. | 424/61 |
| 4,500,693 | 2/1985 | Takehara et al. | 210/701 |
| 4,532,048 | 7/1985 | Amjad et al. | 210/701 |
| 4,536,292 | 8/1985 | Matz | 210/701 |
| 4,552,665 | 11/1985 | Ralston et al. | 252/180 |
| 4,560,481 | 12/1985 | Hollander | 252/180 |
| 4,566,973 | 1/1986 | Masler | 210/701 |
| 4,575,425 | 3/1986 | Boffardi et al. | 210/697 |
| 4,589,985 | 5/1986 | Yorke | 210/699 |
| 4,596,661 | 6/1986 | Gill et al. | 210/728 |
| 4,618,448 | 10/1986 | Cha et al. | 210/701 |
| 4,634,532 | 1/1987 | Logan et al. | 210/697 |
| 4,640,793 | 2/1987 | Persinski et al. | 252/180 |
| 4,711,725 | 12/1987 | Amick et al. | 210/701 |
| 4,784,774 | 11/1988 | Amjad et al. | 210/701 |

FOREIGN PATENT DOCUMENTS

| | | | |
|---|---|---|---|
| WO83/02607 | 8/1983 | PCT Int'l Appl. | 210/701 |
| 2082600 | 3/1982 | United Kingdom | 210/701 |

*Primary Examiner*—Peter Hruskoci
*Attorney, Agent, or Firm*—Nestor W. Shust; George A. Kap

[57] ABSTRACT

Dispersion of particulate matter, especially iron, is obtained by adding to an aqueous medium 0.5 to 500 ppm of a copolymer containing at least one of each of the following three monomer moieties:

(a) monounsaturated carboxylic acids as well as salts and anhydrides thereof, the acids containing 3 to 5 carbon atoms, such as an acrylic acid and methacrylic acid;

(b) acrylamidoalkane sulfonic acids and salts thereof, such as 2-acrylamido-2-methylpropane sulfonic acid; and (c) primary copolymerizable monomers selected from vinyl alcohol, styrene sulfonic acids and salts thereof, and mixtures thereof.

9 Claims, No Drawings

DISPERSION OF PARTICULATES IN AN AQUEOUS MEDIUM

REFERENCE TO RELATED APPLICATION

This is continuation-in-part of application Ser. No. 939,498 filed Dec. 8, 1986 now abandoned and entitled "Terpolymers For Dispersing particulates In An Aqueous Medium".

BACKGROUND OF THE INVENTION

Common deposits in aqueous medium include iron oxides, calcium and magnesium carbonates, sulfates, oxalates, and phosphates, as well as silt, alumina, aluminum silicates, and clays. Environments where some of the deposition problems are often encountered range from silt and mud accumulation in bottoms of water storage tanks and ballast tanks of vessels and on ships, to the fouling problems which occur in water cooling systems using the once-through or recirculating systems and to deposition problems which would occur in cooling and boiler water systems if the water were not treated beforehand.

If all particulate matter could be kept dissolved or at least maintained in suspension, if already in solid state, there would never be any deposition problems to contend with. The phenomenon of suspension involves settling of particles in a liquid medium. The parameters which control settling rates are particle size and relative density of liquid and particles. However, once particles have settled, the nature of the resulting sludge is dependent on the attractive forces between the particles and the surfaces which they contact. If the attractive forces between particles are strong, the formed deposit will be dense but if the attractive forces between the particles are weak, deposition is less likely to occur, particularly at flow conditions.

U.S. Pat. Nos. 3,709,815 and 3,709,816 are directed to boiler water treatment and to control of alluvial and other deposits in aqueous systems by the use of homopolymers and copolymers of acrylamido-alkane sulfonic acid, such as 2-acrylamido-2-methylpropane sulfonic acid or AMPS. The comonomers are selected from water-soluble and water-insoluble monomers. Suitable comonomers include acrylic acid, variants and salts thereof and acrylamide, variants and substituted forms thereof, as well as alkali metal styrene sulfonates and vinyl benzoates, and others. The particulates encompassed by these patents include clay, silt, calcium carbonate, hydrated ferric oxide, silica, magnetic iron oxide, calcium carbonate, magnesium carbonate, aluminum silicate, and the like.

U.S. Pat. Nos. 3,806,367 and 3,898,037 issued from the same patent application. U.S. Pat. No. 3,806,367 is directed to the removal of rust and tubercules from a metal surface whereas U.S. Pat. No. 3,898,037 relates to inhibition of corrosion of a metal surface which is in contact with an aqueous solution. These patents disclose the use of dispersants which are homopolymers and copolymers of acrylamido-alkane sulfonic acid, such as 2-acrylamido-2-methyl propane sulfonic acid or AMPS ®. The copolymers can be polymers of two or three monomers, one of which is an acrylamidoalkane sulfonic acid. Suitable comonomers include acrylic acid, salts thereof and other versions of same; acrylamide and substituted versions thereof; vinyl compounds; vinyl acids and esters thereof; and the like. The comonomers are more fully described in col. 5 of U.S. Pat. No. 3,898,037.

The Amick U.S. Pat. No. 4,711,725 discloses stabilization of an aqueous system by inhibiting precipitation of calcium phosphate with a copolymer antiscalant, said copolymer comprising 42 to 84% of (meth)acrylic acid and salts thereof, 11 to 40% acrylamido alkane sulfonic acid, and 5 to 30% of one or more monomers selected from vinyl esters, vinyl acetate, and substituted acrylamides. The aqueous medium can contain or can be devoid of iron contamination.

The other patent applications concurrently filed for Messrs. Amjad and Masler include one entitled "Scale Control With Copolymers Containing Acrylamidoalkane Sulfonic Acid" and another entitled "Stabilization of Metal Ions With Copolymers Containing Acrylamidoalkane Sulfonic Acid". These cases disclose the use of same or similar polymers.

SUMMARY OF THE INVENTION

This invention is directed to dispersion of particulate matter in aqueous medium by addition thereto of an effective threshold inhibition amount of a copolymer which contains at least three different repeating groups. Such copolymers include polymerized units of monounsaturated carboxylic acid of 3 to 5 carbon atoms and salts thereof, polymerized units of acrylamidoalkane sulfonic acid, and polymerized units of a primary component selected from vinyl alcohol, styrene sulfonic acid, and mixtures thereof. The particulate matter contemplated herein especially includes iron oxide.

DETAILED DESCRIPTION OF THE INVENTION

Copolymers are described herein which are effective in dispersing particulate matter in aqueous media. Such particulate matter includes clay, silt, mud and iron oxide, and particularly iron oxide which forms by corrosion in the system or is introduced by make-up water. Amount of such copolymer that is added to an aqueous medium is an effective threshold inhibition amount which is in the range of 0.5 to 500 parts per million (ppm) of the aqueous medium, preferably 1 to 50 ppm. Although the aqueous medium can be acidic, in a preferred embodiment, it is neutral or alkaline.

Specific applications contemplated herein where the copolymers can be used include aqueous systems used in recirculating cooling towers, steam boilers, desalination, oil field applications in secondary oil recovery operations, flash distillation, as well as in aqueous systems such as sugar solutions. The copolymers are effective in dispersing particulate matter in presence or absence of soluble metal ions such as iron, manganese, or zinc, or mixtures thereof.

The copolymers can be in unneutralized or neutralized form. Such copolymers can be neutralized with a strong alkali, such as sodium hydroxide, in which instance, the hydrogen of the sulfonic acid and carboxyl groups in the copolymer will be replaced with sodium. With the use of an amine neutralizing agent, the hydrogen will be replaced with an ammonium group. Useful copolymers for purposes herein include copolymers that are unneutralized, partially neutralized, and completely neutralized.

The copolymers are soluble in water up to about 20% solids concentration, and they must, of course, be soluble in water in amount used, to be effective antiscalants.

The copolymers contemplated herein are polymers of at least three different monomers and include at least one monomer selected from each one of the following groups (a), (b), and (c):

(a) monounsaturated carboxylic acids of 3 to 5 carbon atoms, salts and anhydrides thereof;
(b) acrylamidoalkane sulfonic acids and salts thereof containing up to 6, preferably 1 to 4, carbon atoms in the alkane moiety; and
(c) primary copolymerizable monomers which aid in the effectiveness of the copolymers as dispersants selected from vinyl alcohol, a styrene sulfonic acid and its salts, and mixtures thereof. It is understood that vinyl alcohol as such cannot be isolated. However, polymerized vinyl alcohol groups can be formed by hydrolysis of polymerized vinyl esters.

In addition to the above three requisite monomers, a small amount of other or secondary copolymerizable monomers can also be used as long as they do not substantially deleteriously affect performance of the copolymers as dispersants. Amount of such secondary copolymerizable monomers can generally vary up to about 20% by weight, preferably up to 10%, and more preferably 2 to 10% by weight of the final copolymer.

The copolymers suitable herein are random non-crosslinked polymers containing polymerized units of one or more of each of the monomers (a), (b), and (c), identified above, and can contain a small proportion of polymerized units of one or more of the secondary copolymerizable monomers. The copolymers have weight average molecular weight of 1,000 to 100,000, preferably 2,000 to 50,000 and more preferably 2,000 to 20,000. The molecular weight given herein is measured by gel permeation chromatography.

The dispersing copolymers disclosed herein contain 20 to 95% by weight of the polymerized carboxylic acid or its salt or anhydride, preferably about 40 to 75%; 5 to 60% by weight of the polymerized sulfonic acid or its salt, preferably about 10 to 40%; 5 to 30%, preferably 5 to 20%; primary comonomer selected from vinyl alcohol, styrene sulfonic acid and salts thereof, and mixtures thereof; and up to 20%, preferably up to 10% of at least one secondary copolymerizable monomer.

The carboxylic acid monomers contemplated herein include monounsaturated monocarboxylic and dicarboxylic acids, salts and anhydrides thereof. Preferred in this class are monounsaturated monocarboxylic acids of 3 to 4 carbon atoms and water soluble salts thereof, particularly acrylic acid and methacrylic acid. Because of its availability, effectiveness and low price, acrylic acid is particularly preferred. Repeating units of acrylic acid, methacrylic acid, and salts thereof are represented as follows:

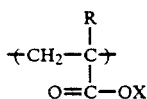

where R is hydrogen or methyl and X can be hydrogen, alkali metal, alkaline earth metal, or ammonium, particularly hydrogen, sodium, potassium, calcium, ammonium, and magnesium.

The repeating units of acrylamidoalkane sulfonic acids and salts thereof are defined as follows:

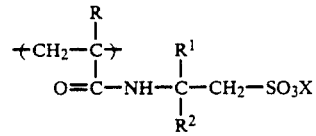

where R is hydrogen or methyl, X is hydrogen, ammonium, alkali metal or an alkaline earth metal, particularly hydrogen, ammonium or an alkali metal, and $R^1$ and $R^2$ are individually selected from hydrogen and alkyl groups of 1 to 4 carbon atoms. In a preferred embodiment, R is hydrogen and $R^1$ and $R^2$ are each an alkyl group of 1 to 3 carbon atoms. In this group of sulfonic acids, 2-acrylamido-2-methyl propane sulfonic acid or AMPS is a commercial, readily available monomer which is especially preferred for the dispersing effectiveness described herein.

The primary copolymerizable monomers are selected from vinyl alcohol, styrene sulfonic acids and salts thereof, and mixtures thereof.

Repeating units of styrene sulfonic acids and salts thereof are defined as follows:

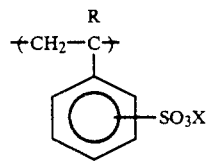

where R is hydrogen or a lower alkyl group of 1 to 6 carbon atoms but preferably hydrogen, and X is alkali metal or alkaline earth metal or ammonium, particularly hydrogen, ammonium or alkali metal. A particularly suitable sulfonic acid is styrene sulfonic acid where R is hydrogen and the —SO$_3$X group is at the 3 or 4 position on the phenyl ring, or a mixture thereof. The salts of styrene sulfonic acids are water-soluble. The sodium salt of styrene sulfonic acid is available commercially.

The monomers can be prepared, if desired, in a conventional manner but they are commercially available and therefore, can be purchased. Polymerization of the monomers results in an essentially non-crosslinked random copolymer, the molecular weight of which can be adjusted with a little trial and error. The copolymer is preferably formed in a high yield ranging from about 50% to about 99% by weight of the comonomers.

It is also a requirement that the copolymer be soluble in water. Typically, the copolymer is used in water in the range of 0.5 to 500 ppm. Thus, high solubility of water treatment compositions is not essential but desirable. The product is preferably shipped in drums as a concentrated aqueous solution containing in the range from about 20% to about 50% by weight of solids per 100 parts of solution, which requires solubility to the extent of at least 20 weight parts per 100 parts of water.

Polymerization of the monomers identified herein can be carried out in a mutual solvent for both, such as in a lower alkanol of about 1 to 6 carbon atoms, or in water, with an effective amount of a free radical initiator sufficient to produce the desired composition within an acceptable period of time. The monomeric acids can be used as such or can be in a partially or a completely neutralized form prior to polymerization.

The reaction is conveniently carried out in water as the only reaction medium at a temperature in the range of about 30° to about 130° C. usually at atmospheric pressure. The concentration of the copolymer formed may range from about 5% to about 50% by weight, based on total solids, which solution can be shipped directly.

The copolymer may also be formed in an acyclic ketone, such as acetone, in an alkanol, in water, or mixtures thereof. If, for example, the copolymer is formed in an organic solvent, or a mixture of an organic solvent and water, the copolymer is converted from the organic solvent solution to a water solution. Typically, the organic solvent is stripped from the solution with steam or distilled off with subsequent additions of water and repetition of distillation to remove the solvent, followed by the addition of water and a neutralizing agent such as caustic solution, ammonia, a hydrazine, or a low-boiling primary, secondary or tertiary aliphatic amine. The copolymers containing vinyl alcohol are formed by subjecting the initially formed vinyl acetate copolymers to hydrolysis conditions whereby the polymerized vinyl acetate groups are converted to polymerized vinyl alcohol groups. In a typical preparation, aqueous sodium hydroxide solution is added to a preformed copolymer containing vinyl acetate groups. The amount of sodium hydroxide used is typically one mol of sodium hydroxide for each mol of polymerized vinyl acetate plus one mol of sodium hydroxide for each mol of polymerized carboxylic and sulfonic acid present.

The final aqueous solution of polymer salt is preferably in the range of about pH 2 to about pH 8, with a total solids content of about 5 to about 50% by weight of polymer in water.

The copolymers formed may have weight average molecular weight in the range of about 1,000 to about 100,000, preferably 2,000 to 50,000, and more preferably about 2,000 to 20,000, as determined by gel permeation chromatography.

In a typical polymerization process, a glass lined or stainless steel jacketed reactor is charged with predetermined amounts of monomers along with solvent and the polymerization catalyst under a nitrogen blanket, and the reaction mixture allowed to exotherm under controlled temperature conditions maintained by a heat-transfer fluid in the jacket of the reactor. The pressure under which the reaction occurs is not critical, it being convenient to carry it out under atmospheric pressure.

The copolymers described herein in connection with dispersion of particulate matter can be used in combination with other conventional additives wherever appropriate. Examples of some of the conventional additions include anti-precipitating agents, oxygen scavengers, sequestering agents, corrosion inhibitors, antifoaming agents, and the like.

EXAMPLE 1

This example demonstrates effectiveness of the AA/AMPS/VOH and AA/AMPS/SSS polymers as calcium phosphate scale inhibitors in presence or absence of iron. Pursuant to the procedure set forth herein, the copolymers formed in the manner described herein were used to treat water which contained calcium ions and phosphate ions in a stirred pH-STAT test while maintaining constant pH and using an automatic tritrator to gauge the effectiveness of the polymer for inhibiting the formation and deposition of calcium phosphate. The test was carried out as follows: a known volume of a phosphate salt solution, such as $Na_2HPO_4$, or another soluble phosphate salt solution, was transferred to a known volume of distilled water in a double-walled glass cell to give a final concentration of about 9 ppm of orthophosphate ions. To this solution was added slowly and with continuous stirring a known volume of testing polymer solution sufficient to give a dosage of 10 ppm.

A pair of glass and reference electrodes, which were calibrated before and after each experiment with standard buffer solutions of pH 7.00 and 9.00, were then immersed in the solution which was maintained at 50° C. by circulating water through the outside of a glass cell jacket. After about 45 minutes, a known volume of calcium chloride solution was slowly added to the continuously stirred solution containing phosphate and polymer, to give a final calcium ion concentration of 140 ppm. The pH of the solution was then immediately brought to pH 8.50 by automatic addition of 0.10M NaOH solution. The pH of the solution was then maintained at 8.50±0.01 throughout the experiment using the pH-stat technique. Solution samples were withdrawn after 22 hours, and analyzed, after filtration through 0.22 micrometer filter paper, for orthophosphate ions using the ascorbic acid method, as described in detail in "Standard Methods for the Examination of Water and Waste Water" 14th edition, prepared and published by American Health Association. The instrument used for the colorimetric measurements was a Beckman 5270 Spectrophotometer.

Tests for calcium sulfate were carried out by the method of Ralston, see J. Pet. Tech., Aug. 1969, 1029–1036.

The percent threshold inhibition (TI) attained for each experiment was obtained using the following formula, shown in this case for calcium phosphate:

$$\% \text{ TI} = \frac{(PO_4) \text{ exp} - (PO_4) \text{ final}}{(PO_4) \text{ initial} - (PO_4) \text{ final}} \times 100$$

where $(PO_4)$ exp = concentration of phosphate ion in the filtrate in presence of the copolymer at time of 22 hours $(PO_4)$ final = concentration of phosphate ion in filtrate in absence of the copolymer at time 22 hours $(PO_4)$ initial = concentration of phosphate ion at time zero.

Scale inhibition results referred to above are set forth in Table I, below:

TABLE I

| Composition | Monomer Wt. Ratio | Mol. Wt. | % Ca/P[a] Inhibition |
|---|---|---|---|
| AA:AMPS/VOAc | 44:31:25 | 15,000 | 67 |
| AA:AMPS:VOH | 50:35:15 | 15,000 | 73 |
| AA:AMPS:VOAc | 42:25:33 | 15,000 | 64 |
| AA:AMPS:VOH | 50:30:20 | 15,000 | 69 |
| AA:AMPS:VOAc | 46:36:18 | 30,000 | 69(77) |
| AA:AMPS:VOH | 50:40:10 | 30,000 | 93(85) |
| AA:AMPS:VOAc | 35:39.5:25.5 | 15,000 | 43 |
| AA:AMPS:VOH | 40:45:15 | 15,000 | 76 |
| AA:AMPS:VOAc | 50:30:20 | 20,000 | 88(90) |
| AA:AMPS:VOH | 55.4:33.2:11.4 | 20,000 | 96(94) |
| AA:AMPS:VOAc | 50:30:20 | 10,000 | 94(87) |
| AA:AMPS:VOH | 55.4:33.2:11.4 | 10,000 | 87(76) |
| AA:AMPS:VOAc | 50:30:20 | 14,000 | 97(92) |
| AA:AMPS:VOH | 55.4:33.2:11.4 | 14,000 | 87(85) |
| AA:AMPS:VOAc | 60:20:20 | 10,000 | 91(93) |
| AA:AMPS:VOH | 66.2:22.5:11.3 | 10,000 | 95(57) |
| AA:AMPS:VOH | 66.2:22.5:11.3 | 5,000 | 74 |
| AA:AMPS:VOH | 63:31.5:5.5 | 5,000 | 96 |
| AA:AMPS:VOAc | 70:20:10 | 10,000 | 78(59) |
| AA:AMPS:VOH | 73.6:21.5:5.4 | 10,000 | 56(30) |
| AA:AMPS:VOAc:DMI | 46:27:18:9 | 15,000 | 76 |

TABLE I-continued

| Composition | Monomer Wt. Ratio | Mol. Wt. | % Ca/P[a] Inhibition |
|---|---|---|---|
| AA:AMPS:VOH:DMI | 50:30:10:10 | 15,000 | 80 |
| AA:AMPS:VOAc:DADMAC | 55:18:18:9 | 15,000 | 30 |
| AA:AMPS:VOH:DADMAC | 60:20:10:10 | 15,000 | 59 |
| AA:AMPS:VOAc | 49:37.3:13.7 | 15,000 | 78 |
| AA:AMPS:VOH | 52.5:40:7.5 | 15,000 | 83 |
| AA:AMPS:VOAc | 46:36:18 | 50,000 | 50 |
| AA:AMPS:VOH | 50:40:10 | 50,000 | 89 |
| AA:AMPS:VOAc | 46:36:18 | 60,000 | 52 |
| AA:AMPS:VOH | 50:40:10 | 60,000 | 100 |
| AA:AMPS:SSS | 70:10:20 | 5,000 | 81 |
| " | 70:10:20 | 15,000 | 77 |
| " | 60:10:30 | 5,000 | 93 |
| " | 60:10:30 | 10,000 | 95 |
| " | 60:10:30 | 15,000 | 89 |
| " | 60:30:10 | 5,000 | 92(72) |
| " | 60:30:10 | 15,000 | 99(79) |
| " | 60:30:10 | 29,000 | 94(67) |
| " | 60:30:10 | 33,000 | 86(71) |
| " | 60:32.5:7.5 | 15,000 | 97 |
| " | 50:30:20 | 5,000 | 92 |
| " | 50:30:20 | 10,000 | 95 |
| AA:AMPS:SSS | 50:30:20 | 15,000 | 96 |
| " | 50:30:20 | 30,000 | 95 |
| " | 40:30:30 | 5,000 | 66 |
| " | 40:30:30 | 10,000 | 87 |
| " | 40:30:30 | 15,000 | 95(85) |
| " | 40:50:10 | 15,000 | 83 |
| " | 50:30:20 | 60,000 | 86 |
| " | 50:40:10 | 50,000 | 95 |
| AA:AMPS:SSS:DADMAC | 60:25:10:5 | 15,000 | 74 |

[a]Conditions: calcium = 140 ppm; phosphate = 9 ppm; pH = 8.50; T = 50° C.; time = 22 hr.; polymer = 10 ppm
( ) Values in parentheses are in the presence of 1 ppm iron.

Dispersancy activity of the copolymers tested herein was measured as a function of time for a particulate concentration of a copolymeric dispersant which was tested in a dilute aqueous solution. In these tests, 0.12 grams of iron oxide was added to an 800 ml beaker containing 600 mls synthetic water and the indicated amount of the copolymer. Synthetic water had the following composition:

| Ca | = | 100 ppm | Mg | = | 30 ppm |
|---|---|---|---|---|---|
| Na | = | 314 ppm | Cl | = | 571 ppm |
| SO₄ | = | 200 ppm | HCO₃ | = | 60 ppm |

The slurries were stirred using 6 paddle stirrer and % transmittance (T) determined at known time using a Brinkmann PC-1000 colorimeter. Dispersancy (D) was measured as a function of the amount of iron oxide dispersed. The performance of the polymer was determined by comparing % D values of the slurries containing polymer against control with no polymer. Greater dispersancy was, therefore, indicated by higher % D value which means that the higher % D numbers indicated greater polymer effectiveness. The % dispersancy was calculated using the following formula:

$$\% D = (100 - 1.11 \times \% T)$$

EXAMPLE 2

This example demonstrates dispersion effectiveness of certain terpolymers containing vinyl alcohol and other terpolyomers containing vinyl acetate which were hydrolyzed to the terpolymers containing vinyl alcohol. The vinyl acetate-containing terpolymers were hydrolyzed by refluxing them at about 100° C. for about two hours in an aqueous solution containing one mole of sodium hydroxide per mole of vinyl acetate and one mole of sodium hydroxide per mole of carboxylic acid and sulfonic acid present. The results given in Table II, below, are given in percent dispersancy.

TABLE II

| Composition | Monomer Wt. | Mol. Wt. | % Dispersed |
|---|---|---|---|
| AA:AMPS/VOAc | 44:31:25 | 15,000 | 76 |
| AA:AMPS:VOH | 50:35:15 | 15,000 | 77 |
| AA:AMPS:VOAc | 42:25:33 | 15,000 | 50 |
| AA:AMPS:VOH | 50:30:20 | 15,000 | 44 |
| AA:AMPS:VOAc | 46:36:18 | 30,000 | 56 |
| AA:AMPS:VOH | 50:40:10 | 30,000 | 58 |
| AA:AMPS:VOAc | 35:39.5:25.5 | 15,000 | 82 |
| AA:AMPS:VOH | 40:45:15 | 15,000 | 81 |
| AA:AMPS:VOAc | 70:20:10 | 10,000 | 49 |
| AA:AMPS:VOH | 73.6:21:5.4 | 10,000 | 59 |
| AA:AMPS:VOAc | 60:20:20 | 10,000 | 78 |
| AA:AMPS:VOH | 66.2:22.5:11.3 | 10,000 | 73 |
| AA:AMPS:VOAc | 60:30:10 | 5,000 | 92 |
| AA:AMPS:VOH | 63:31.5:5.5 | 5,000 | 94 |
| AA:AMPS:VOAc | 50:35:15 | 15,000 | 75 |
| AA:AMPS:VOH | 54:37.8:8.2 | 15,000 | 80 |
| AA:AMPS:VOAc | 60:30:10 | 10,000 | 93 |
| AA:AMPS:VOH | 63:31.5:5.5 | 10,000 | 87 |
| AA:AMPS:VOAc | 60:20:20 | 5,000 | 88 |
| AA:AMPS:VOH | 66.2:22.5:11.3 | 5,000 | 75 |
| AA:AMPS:VOAc:DMI | 46:27:18:9 | 15,000 | 33 |
| AA:AMPS:VOH:DMI | 50:30:10:10 | 15,000 | 45 |
| AA:AMPS:VOAc:DADMAC | 55:18:18:9 | 15,000 | 25 |
| AA:AMPS:VOH:DADMAC | 60:20:10:10 | 15,000 | 31 |

EXAMPLE 3

This example demonstrates terpolymers of acrylic acid, AMPS, and sodium styrene sulfonic acid (AA:AMPS:SSS) as dispersing agents for iron oxide. Results are given in Table III, below.

TABLE III

| Monomer Wt. Ratio | Mol. Wt. | @ 1.0 ppm Polymer % D |
|---|---|---|
| 70:10:20 | 5,000 | 76 |
|  | 10,000 | 77 |
|  | 15,000 | 66 |
| 60:10:30 | 5,000 | 72 |
|  | 10,000 | 72 |
|  | 15,000 | 74 |
| 60:30:10 | 5,000 | 83 |
|  | 14,000 | 87 |
|  | 29,000 | 68 |
| 60:32.5:7.5 | 15,000 | 91 |
| 50:30:20 | 5,000 | 78 |
|  | 10,000 | 90 |
|  | 15,000 | 79 |
|  | 30,000 | 77 |
| 40:30:30 | 5,000 | 89 |
|  | 10,000 | 91 |
|  | 15,000 | 81 |
| 40:50:10 | 15,000 | 88 |

We claim:

1. A method for dispersing particulate matter selected from clay, silt, iron oxide, and mixtures thereof, in the presence or absence of metal ions, and in the presence of calcium phosphate, in an aqueous medium comprising adding to said aqueous medium an effective amount of a water-soluble copolymer for the purpose of dispersing and maintaining dispersed said particulate matter, said copolymer consisting essentially of ( a) 40 to 75% by weight carboxylic monomer selected from acrylic acid, methacrylic acid, salts of such acids, and mixtures thereof, (b) 10 to 40% by weight of a sulfonic monomer selected from 2-acrylamido-2-methylpropane sulfonic acid, 2-methacrylamido-2-methylpropane sulfonic acid, salts of said acids, and mixtures thereof, (c) 5 to 30% of a primary copolymerizable comonomer selected from vinyl alcohol, styrene sulfonic acids, salts of such acids, and mixtures thereof, said copolymer has weight average molecular weight in the range of about 1,000 to 100,000, and (d) up to 20% by weight of one or more secondary copolymerizable monomers which do not deleteriously effect performance of said copolymer, said second copolymerizable monomer excludes substituted acrylamides, vinyl esters, and vinyl acetate; said copolymer has weight average molecular weight in the range of about 1,000 to 100,000 and said metal ions are selected from iron, manganese, zinc, and mixtures thereof.

2. Method of claim 1 wherein amount of said copolymer is 1 to 50 ppm and its molecular weight is in the range of about 2,000 to 50,000.

3. Method of claim 2 wherein in said copolymer, said primary comonomer is vinyl alcohol.

4. Method of claim 2 wherein in said copolymer, said primary comonomer is styrene sulfonic acid or a salt thereof.

5. Method of claim 2 wherein in said copolymer, said primary comonomer is selected from styrene sulfonic acids and salts thereof defined as follows:

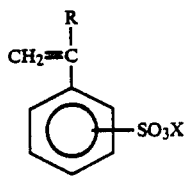

where R is selected from hydrogen and alkyl groups of 1 to 6 carbon atoms, and X is selected from hydrogen, alkali metals, alkaline earth metals, ammonium groups, and mixtures thereof.

6. Method of claim 5 wherein in the formula, R is selected from hydrogen and alkyl groups 3 or 4 position of the phenyl ring, and said aqueous medium contains up to 10 ppm of iron.

7. Method of claim 1 wherein amount of said secondary monomer is up to 10% by weight and molecular weight of said copolymer is 2,000 to 20,000.

8. Method of claim 7 which is carried out to attain transmittance of 20% or less when measured at a level of 1 ppm of said copolymer wherein said aqueous medium is alkaline and is selected from process water used in steam generating systems, recirculating cooling water systems, gas scrubbing systems, desalination water systems, and crude petroleum recovery systems.

9. Method of claim 1 wherein said copolymer has molecular weight of about 2,000 to 50,000 and is selected from the following copolymers, given in weight parts:
 (a) 40 to 75% acrylic acid, methacrylic acid, or mixtures thereof;
 (b) 10 to 40% acrylamido methylpropane sulfonic acid;
 (c) 5 to 30% vinyl alcohol, or styrene sulfonic acid or salts thereof, or mixtures thereof; and
 (d) up to 10% of one or more other copolymerizable monomers.

* * * * *